(12) United States Patent
Ionov et al.

(10) Patent No.: US 6,912,075 B1
(45) Date of Patent: Jun. 28, 2005

(54) RING ARCHITECTURE FOR AN OPTICAL SATELLITE COMMUNICATION NETWORK WITH PASSIVE OPTICAL ROUTING

(75) Inventors: Stanislav I. Ionov, Calibasas, CA (US); George C. Valley, Los Angeles, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

(21) Appl. No.: 09/313,428

(22) Filed: May 17, 1999

(51) Int. Cl.⁷ .............................................. H04B 10/00
(52) U.S. Cl. ..................... 359/172; 359/152; 359/174; 359/119
(58) Field of Search ................... 359/172, 152, 359/119, 127, 173, 174; 370/310

(56) References Cited

U.S. PATENT DOCUMENTS

| | | | | |
|---|---|---|---|---|
| 4,545,075 A | * | 10/1985 | Miller et al. | 359/172 |
| 4,928,317 A | * | 5/1990 | Franchini | 359/172 |
| 5,119,225 A | * | 6/1992 | Grant et al. | 359/172 |
| 5,218,467 A | * | 6/1993 | Ross et al. | 359/172 |
| 5,394,489 A | | 2/1995 | Koch | 385/14 |
| 5,475,520 A | | 12/1995 | Wissinger | 359/172 |
| 5,552,920 A | | 9/1996 | Glynn | 359/172 |
| 5,661,582 A | * | 8/1997 | Kintis et al. | 359/172 |
| 5,710,652 A | | 1/1998 | Bloom et al. | 298/129 |
| 5,870,216 A | | 2/1999 | Brock et al. | 359/172 |
| 5,884,142 A | | 3/1999 | Wiedeman et al. | 455/12.1 |
| 5,956,620 A | | 9/1999 | Lazaris-Brunner et al. | 455/12.1 |
| 6,002,916 A | * | 12/1999 | Lynch | 455/13.1 |
| 6,032,041 A | | 2/2000 | Wainfan et al. | 455/427 |
| 6,043,776 A | * | 3/2000 | Chiba et al. | 342/354 |
| 6,128,112 A | | 10/2000 | Harres | 398/38 |
| 6,160,994 A | | 12/2000 | Wiedeman | 455/121 |
| 6,208,625 B1 | | 3/2001 | Zancho et al. | 370/316 |
| 6,219,617 B1 | | 4/2001 | Dreischer et al. | 701/226 |
| 6,222,658 B1 | | 4/2001 | Dishman et al. | 359/172 |
| 6,226,493 B1 | | 5/2001 | Leopold et al. | 455/13.1 |
| 6,243,513 B1 | | 6/2001 | Wade | 385/24 |
| 6,257,526 B1 | | 7/2001 | Taormina et al. | 244/158 R |
| 6,267,329 B1 | | 7/2001 | Chethik | 244/158 R |
| 6,295,152 B1 | | 9/2001 | Wedding | 398/209 |
| 6,304,354 B2 | * | 10/2001 | Carlson | 359/172 |
| 6,307,879 B1 | | 10/2001 | Moriyama | 375/219 |
| 6,327,063 B1 | | 12/2001 | Rockwell | 359/172 |
| 6,339,707 B1 | | 1/2002 | Wainfan et al. | 455/427 |
| 6,366,761 B1 | | 4/2002 | Montpetit | 455/12.1 |
| 6,477,153 B1 | | 11/2002 | Leopold et al. | 455/13.1 |
| 6,545,787 B1 | | 4/2003 | Lenormand et al. | 359/172 |

OTHER PUBLICATIONS

D. Grybos et al., "Technology For the Furture Marketplace, A Perspective on Ka and ON–Board Processing Technology", IEE, May 1–6, 1998.

* cited by examiner

Primary Examiner—Kinfe-Michael Negash
(74) Attorney, Agent, or Firm—Georgann S. Grunebach

(57) ABSTRACT

A node for satellite system communications between a ground station and a satellite includes a fiber optic bus on the satellite. An optical drop is coupled to the bus. The optical drop resolves an optical signal destined to the given satellite from the optical bus. An uplink and downlink receive and transmit communications from a ground terminal. A router is coupled to the optical drop and the uplink and downlink. An address reader and a table are used by the router to determine the destination of the received RF signals. The received RF signals are converted to optical signals by an optical source. The optical source has a wavelength that corresponds with the destination satellite. The optical signals are transmitted to an adjacent satellite by an optical transmitter such as a transmitting telescope.

31 Claims, 1 Drawing Sheet

RING ARCHITECTURE FOR AN OPTICAL SATELLITE COMMUNICATION NETWORK WITH PASSIVE OPTICAL ROUTING

TECHNICAL FIELD

The present invention relates to space and communications satellites, and more particularly, to a communication system to interconnect satellites.

BACKGROUND ART

Satellites in geostationary orbits (GSO's) have been widely preferred because of the economic advantages afforded by such orbits. In a geostationary orbit, a satellite traveling above the earth's equator, in the same direction as that in which the earth is rotating, and at the same angular velocity, appears stationary relative to a point on the earth. These satellites are always "in view" at all locations within their service areas, so their utilization efficiency is effectively one-hundred percent. Antennas on earth need be aimed at a GSO satellite only once; no tracking system is required.

Coordination between GSOs and with terrestrial services is facilitated by governmental allocation of designated "slots" angularly spaced according to service type.

Given the desirability of geostationary satellite orbits and the fact that there are only a finite number of available "slots" in the geostationary "belt," the latter capacity has been essentially saturated with satellites operating in desirable frequency bands up through the Ku-band (up to 18 GHz). As a result, the government has been auctioning the increasingly scarce remaining slots.

The bottleneck in ground-to-satellite communications may be overcome by increasing the number of RF beams on board of a single satellite, increasing the number of satellites, e.g. deploying those using low earth orbits (LEO's), medium earth orbits (MEO's), or by putting several satellites into a single GSO slot and by using higher frequencies, for example, the Ka band (up to approximately 40 GHz). This appears to be a limit on the number of RF antennas on board of a single satellite. At this point, 50–100 antennas. Growth to higher frequencies is limited by difficult problems in technology and propagation. Expansion in satellite applications requires exploitation of the spatial dimension (i.e., above and below the GSO belt). A host of proposed LEO and MEO systems exemplify this direction.

Therefore, the only remaining way for increasing the capacity of satellite communication systems is increasing the number of the satellites. In this approach, the satellites are interconnected into a network that serves a wide geographic area. Today, laser communication links are planned for intersatellite communications. The advantage of optical intersatellite links over RF links derives from (i) reduced power consumption and (ii) considerably smaller size and weight of an optical telescope versus an RF antenna. As a result, a single satellite can house more communication links, thereby increasing the overall data-handling capacity.

Satellite communications systems employing multiple RF ground links and optical intersatellite links will use complicated switching electronics to route the ever increasing volumes of data traffic. Systems that are being developed include a router that acts as a high speed switch. All data whether optical or RF uplink or downlink signals are converted to the electrical domain and routed appropriately through the satellite. The high speed switching electronics are enlarged to accommodate the optical signals.

High speed switching electronics consume a significant amount of electric power which is always at a premium on board of satellites. Moreover, as the volume of data traffic transmitted by numerous RF and optical channels of a satellite increases, the electronic switch becomes the bottleneck that limits the overall network capacity.

SUMMARY OF THE INVENTION

It would therefore be desirable to provide an efficient system that allows communication with other satellites in the network while minimizing the electronic burden on the satellite.

In one aspect of the invention, a node for satellite communication systems between a ground station and a satellite includes a fiber optic bus on the satellite. An optical drop is coupled to the bus. The optical drop resolves an optical signal from the optical bus. An uplink and downlink receive and transmit communications from a ground terminal. A router is coupled to the optical drop and the uplink and downlink. An address reader and a table are used by the router to determine the destination of the received RF signals. The received RF signals are converted to optical signals by an optical source. The optical generator has a wavelength that corresponds with the destination satellite. The optical signals are transmitted to an adjacent satellite by a transmitting telescope.

In the present invention, passive optical routing is used as a way to shift a part of the routing load from the electronic to the optical domain. In the illustrative example, a network of satellites is arranged into a topological ring. Such configuration is deemed particularly appropriate for a network of GSO satellites. The satellites employ optical links for communicating between each other and RF links with the ground. In order to minimize power consumption, each satellite has direct optical links with its neighbors only. In this arrangement, the information transmitted between remote satellites is relayed to them by intermediaries.

In the preferred embodiment, each pair of communicating satellites use different optical carriers (i.e., optical signals of different wavelength and/or polarization) for communicating between each other. The optical carriers are assigned in such a way that only substantially different carriers are present simultaneously on each direct satellite-to-satellite optical link. Upon receiving an optical beam from a neighbor, each satellite uses an optical drop to separate optical carriers designated for down transmission from this satellite from the other carriers. The remaining carriers are amplified optically and relayed to the next satellite along the ring without being converted into electronic format. Since electronics is not involved into routing of the relayed traffic, significant load is removed from the on-board electronics, resulting in a reduced power consumption and weight as well as in increased network capacity.

Other objects and features of the present invention will become apparent when viewed in light of the detailed description of the preferred embodiment when taken in conjunction with the attached drawings and appended claims.

BEST MODE(S) FOR CARRYING OUT THE INVENTION

Figure 1:
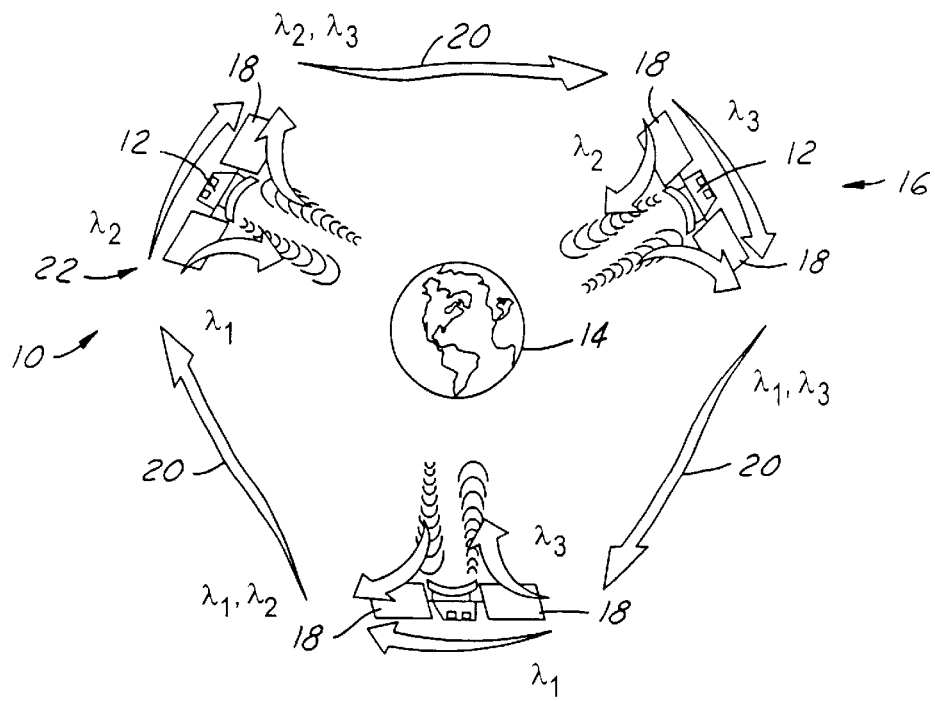
FIG. 1 is a view of a satellite network in the deployed configuration in which the present invention is applicable.

Referring now to FIG. 1, a communication system 10 is comprised of a plurality of satellites 12 orbiting the earth.

Satellites 12 may be in geosynchronous orbit (GSO), medium earth orbit (MEO) and low earth orbit (LEO) around earth 14. Although this invention may be used for other types of orbits, this invention is particularly suitable for satellites in GSO.

Satellites 12 form a network 16. Each satellite 12 receives and transmits radio frequency (RF) communications to earth by way of antennas 18. As will be further described below, each satellite 12 communicates with an adjacent satellite in network 16 using optical signals. Because the satellites are spaced apart with respect to the earth and, if satellites 12 are in LEO or MEO, the relative position of satellites 12 with respect to the earth is changing. At any particular time, one or more satellites may be in view of the earth at a suitable elevation angle. As will be further described below, communications desired for that portion of the earth may be routed to one of the corresponding satellites in view at that particular time.

As illustrated, communications between satellites is shown in one dimension. That is, optical communications represented by arrows 20 travel in a clockwise direction. It should be understood by those skilled in the art that a second direction may be added to the satellites by duplicating onboard hardware.

RF communications from the ground enter the optical network through a node on the satellite. Preferably, all communications between satellites occurs using the optical network. By using the optical network, ground resources may be minimized.

Each satellite is shown having a particular optical wavelength associated with each satellite. A total of three wavelengths are illustrated represented by $\lambda_1$, $\lambda_2$ and $\lambda_3$. The communications between satellite represented arrows 20 have two wavelengths associated with it. One wavelength is removed from the pair and is converted to an RF signal for downlinking while the other is passed through without involvement of the satellite routing or switching electronics. Though only one wavelength is shown in FIG. 1 to be removed by a given satellite from the network 16, those skilled in the art will understand that several wavelengths are removed when several satellites send optical signals to the given satellite.

Figure 2:
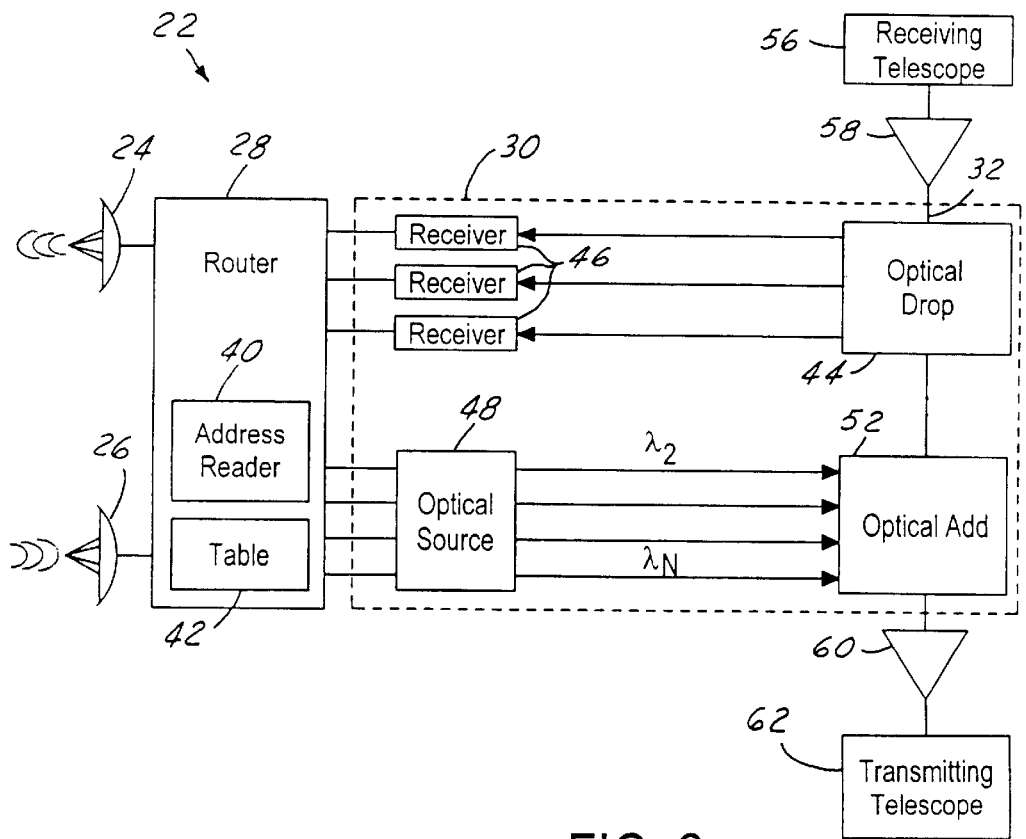
FIG. 2 is a schematic view of an on-board communications system according to the present invention.

Referring now to FIG. 2, a node 22 has a downlink 24 and an uplink 26 coupled to a router 28. Router 28 is coupled to an optical interface 30. Optical interface couples router 28 to an optical bus 32. In general, downlink 24 and uplink 26 are used to transmit to and receive radio frequency (RF) signals from a ground station located on the earth. Signals that are received through uplink 26 that are destined for other satellites are routed through router 28, converted to optical signals in optical interface 30 and are coupled to optical bus 32 where they are transmitted to other satellites as will be further described below.

Downlink 24 and uplink 26 have antennas and demodulators that are commonly used in the satellite industry. For example, uplink 26 and downlink 24 may be phased array antennas. Downlink 24 converts electrical signals from router 28 into corresponding RF signals to be transmitted to a ground station. Uplink 26 converts the RF signals generated at a ground station into an electrical signal for further processing by router 28. As shown, a single downlink 24 and a single uplink 26 are illustrated. However, those skilled in the art will recognize that various numbers of uplinks and downlinks may be used on satellites.

The RF signals received through uplink 26 include data that is ultimately destined for retransmission to a ground terminal. To identify the destination of the data, a header or other identifying information may also be transmitted with the RF signal. The combination of data and routing information is known as an information packet and is used in an asynchronous transfer mode.

Router 28 may, for example, be comprised of an asynchronous transfer mode (ATM) switch. Router 28 may operate in the asynchronous transfer mode to avoid confusion between the various signals. Of course, other communications methods such as time-dependent multiple access (TDMA), frequency division multiplexing (FDMA), or code dependent multiple access (CDMA) may also be used. Other appropriate types of switch architectures are employed in the latter cases. The following description, however, will be limited to an ATM switch.

Router 28 may also have an address reader 40 and an address table 42. Address reader 40 reads the header information contained from the uplinked signals. Table 42 is a lookup table for the header information. The header information is coded and thus table 42 decodes the header information and provides router 28 with where the electrical signal is to be routed. The table information may, for example, provide information as to the proper wavelength for the satellite for which the information is destined, or that this particular data should be routed to the downlink 24 for direct retransmission back to Earth.

Optical interface 30 is coupled to optical bus 32. Optical interface 30 has an optical drop 44. Optical drop 44 is a dispersing device capable of resolving desired optical signals from the plurality of optical signals on bus 32. For example, optical drop 44 may use a fiber wavelength division multiplexer (WDM), a Mach-Zehnder add/drop optical filter or a waveguide grading router. Optical drop 44 is used to resolve or remove the optical carrier of interest from optical bus 32. Preferably, most or all of the energy of the particular optical carrier is removed from the bus. This allows that particular optical carrier to be reused without interference. Various wavelengths may be transmitted through optical bus 32 that correspond with various communications destined for various satellites. Optical drop 44 removes from the bus 32 only the optical signals destined for node 22.

The optical signal from optical bus 32 that is removed by optical drop 44 is coupled to a receiver 46 or a plurality of receivers 46 suitable for receiving several optical signals.

Receiver 46 may, for example, be an optical detector. An amplifier or other logic circuitry may be associated with receiver 46 in a conventional manner. Receivers 46 are coupled to router 28, which directs them to the appropriate RF antennas. Though only one receiver 46 is shown in FIG. 2, more receivers may be required if optical drop 44 removes more than one optical carrier from the bus 32.

Router 28 is coupled to optical interface 30 and, more specifically, to an optical source 48. Optical source 48 generates and modulates optical signals. The optical signals generated by optical signal source 48 have a wavelength that corresponds to the satellite to which the optical signal should be routed. As represented, wavelengths $\lambda_2$ to $\lambda_N$ are illustrated. That is, $\lambda_1$ is assumed to be associated with node 22. Though only one wavelength $\lambda$ is assumed to be associated with the given satellite, those skilled in the art will understand that more wavelengths may be associated with a satellite. This may be required if more than one satellite sends optical signals to the given satellite over the same optical link.

An optical add 52 is coupled to optical source 48. Optical add 52 receives the optical signal generated by optical source 48 and couples the optical signal to bus 32. The same devices that are used as optical drop 44 may be used as optical add 52. Of course, other means for coupling the optical signal to bus would be evident to those in the art.

Optical bus 32 is coupled to other satellites by a receiving telescope 56 and an optical preamplifier 58. Telescope 56 is aimed at an adjacent satellite and receives the optical signals from the adjacent satellite. Preamplifier 58 amplifies each of the incoming optical signals from the receiving telescope 56. Optical preamplifier 58 is coupled to bus 32. Each of the optical signals, except for those destined for the node 22, is transmitted through optical bus 32 to amplifier 60. Amplifier 60 is coupled to a transmitting telescope 62. Optical telescope 62 may, for example, be a transmitting optical telescope. Optical telescope 62 is directed at an adjacent satellite in the network. Although only one receiving and one transmitting telescope is illustrated, several telescopes may be employed on a satellite. Preferably, the satellites have telescopes that optically couple the satellite to its nearest neighbors in the network.

The capacity of the individual optical channel is limited by the speed of the attached electronics, which currently does not exceed about 20 Gigabytes per second. By using multiple optical channels, the capacity may be increased by the number of available optical frequencies. For example, commercially available fiber WDM and waveguide grading routers have up to 32 optical channels. For fiber-coupled grading monochromators, 128 channels are common. Of course, the number of channels may be effectively doubled by using left and right circular polarizations.

In this embodiment, a seamless way for providing a relatively slow data stream from RF channels into a high data rate optical network without using state of the art electronics that increase the cost of the satellite.

The method of operating the system generally includes the steps of receiving an electrical signal from a ground station. Router 28 routes the signal to downlink 24 if the signal is destined for transmission by the same satellite. If the received RF signal is destined for transmission by another satellite, the electrical signal is routed to optical interface 30. The optical source 48 of optical interface 30 modulates the electronic signal onto a corresponding optical signal. An optical add 52 couples the optical signal into bus 32. The optical signals are transmitted to an adjacent satellite by optical telescope 62.

In this manner the complexity of the router 28 may be reduced from that which would normally be implemented in a satellite. The optical signals destined for other satellites is not removed from the system. The above embodiments may also be expanded in scope to a satellite that has two or more optical frequencies of interest. Two optical frequencies may be desirable to identify the type of signal. For example, broadcast satellite and internet traffic may use two different optical carriers. Each may then be routed to different downlinks. The router may easily route the signals and may even prioritize the signals.

Those skilled in the art will understand that the described passive optical routing may be combined with other communication techniques, as for example, TDMA, FDMA and CDMA.

While particular embodiments of the invention have been shown and described, numerous variations and alternate embodiments will occur to those skilled in the art. Accordingly, it is intended that the invention be limited only in terms of the appended claims.

What is claimed is:

1. A node for a satellite system for communications between a ground station and a satellite comprising:
   an RF uplink receiving a first RF signal from the ground station and converting said first RF signal to a first electrical signal;
   an RF downlink for generating a second RF signal and transmitting the second RF signal to the ground station;
   a receiving telescope;
   an optical bus coupled to said receiving telescope, said optical bus having a plurality of optical signals from said receiving telescope:
   an optical interface coupled to said optical bus, said optical interface resolving a predetermined optical signal from said optical bus that is associated with the satellite, said optical interface converting said predetermined optical signal into a second electrical signal; and
   a router coupled to said optical interface, said RF uplink and said RF downlink, said router identifying said first electrical signal and routing said first electrical signal to said optical interface or said RF downlink, said router routing said second electrical signal from said optical interface to said RF downlink.

2. A node for a satellite system as recited in claim 1 wherein said optical interface comprises an optical drop coupled to said optical bus, said optical drop resolving said predetermined optical signal from said optical bus, said optical interface converting said first electrical signal into a second optical signal.

3. A node for a satellite system as recited in claim 2 wherein said optical drop comprises one selected from the group consisting of a wavelength division multiplexer, a drop/add filter, and a waveguide grating router.

4. A node for a satellite system as recited in claim 1 wherein said optical interface comprises a receiver, said receiver converting said predetermined optical signal to said second electrical signal.

5. A node for a satellite system as recited in claim 1 wherein said optical interface comprises an optical source coupled to said optical bus for converting said first electrical signal into a second optical signal.

6. A node for a satellite system as recited in claim 1 further comprising a transmitting telescope coupled to said optical bus.

7. A node for a satellite system as recited in claim 1 further comprising an amplifier coupled to said receiving telescope.

8. A node for a satellite system as recited in claim 1 wherein said first RF signal has a header.

9. A node for a satellite system as recited in claim 8 further comprising an address reader.

10. A node for a satellite system as recited in claim 8 further comprising a table.

11. A node for a satellite system as recited in claim 1 wherein the first electrical signal and the second electrical signal comprise a respective first address and second address, said router routing said first electrical signal and said second electrical signal in response to said respective first address and said second address.

12. A communication system comprising:
   a ground station;
   a first satellite node;
   a second satellite node optically coupled to said first satellite node;
   a first receiving telescope;
   said first satellite node comprising a first optical bus coupled to said first receiving telescope, said first optical bus having a plurality of optical signals from said first receiving telescope;

a first RF uplink receiving a first RF signal from said ground station and converting the first RF signal to a first electrical signal;

a first RF downlink for generating a second RF signal and transmitting the second RF signal to said ground station;

a first optical interface coupled to said first optical bus, said first optical interface resolving a first predetermined optical signal from said first optical bus that is associated with said first satellite node, said first optical interface converting said first predetermined optical signal into a second electrical signal;

a first router coupled to said first optical interface, said first RF uplink and said first RF downlink, said first router identifying said first electrical signal and routing said first electrical signal to said first optical interface or said first RF downlink, said first router routing said second electrical signal to said first RF downlink:

said first optical interface generating a first optical output signal corresponding to said first electrical signal, said first optical interface coupling said first optical output signal to said first optical bus;

a first optical transmitter coupling said first satellite node to said second satellite node;

a second receiving telescope;

said second satellite node comprising a second optical bus coupled to said second receiving telescope, said second optical bus having a plurality of optical signals from said second receiving telescope;

a second RF uplink receiving a third RF signal from said ground station and converting the third RF signal to a third electrical signal;

a second RF downlink for generating a fourth RF signal and transmitting the fourth RF signal to said ground station;

a second optical interface coupled to said second optical bus, said second optical interface resolving a second predetermined optical signal from said second optical bus that is associated with said second satellite node, said second optical interface converting said second predetermined optical signal into a fourth electrical signal: and a second router coupled to said second optical interface, said second RF uplink and said second RF downlink, said second router identifying said third electrical signal and routing said third electrical signal to said second optical interface or said second RF downlink, said second router routing said fourth electrical signal to said second RF downlink.

13. A communication system as recited in claim 12 wherein said first optical interface resolves a first wavelength from said first optical bus; said second optical interface resolves a second wavelength, wherein said first wavelength is different from said second wavelength.

14. A communication system as recited in claim 12 wherein said first optical interface comprises an optical drop coupled to said first optical bus, said optical drop resolving said first predetermined optical signal from said first optical bus.

15. A communication system as recited in claim 12 wherein said optical drop comprises one selected from the group consisting of a wavelength division multiplexer, a drop/add filter, and a waveguide grating router.

16. A communication system as recited in claim 12 wherein said first optical interface comprises a receiver, said receiver converting said first predetermined optical signal to said second electrical signal.

17. A communication system as recited in claim 12 wherein said first optical interface comprises an optical source coupled to said first optical bus for converting said first electrical signal into said first optical output signal.

18. A communication system as recited in claim 17 further comprising an optical add coupled to said optical source for coupling said first optical output signal to said first optical bus.

19. A communication system as recited in claim 12 wherein said first satellite node, said second satellite node, and a third satellite node are disposed in a ring.

20. A method of communicating within a satellite communication system comprising the steps of:

receiving a plurality of optical signals from a first satellite;

resolving a first optical signal from the plurality of optical signals;

transmitting the plurality of optical signals minus the first optical signal to another satellite;

converting the first optical signal into an electrical signal, converting the electrical signal into a corresponding RP signal; and transmitting the corresponding RF signal to a ground station.

21. A method as recited in claim 20 further comprising the steps of:

receiving a second RF signal;

converting the second RF signal into a second electrical signal;

converting the second electrical signal into a second optical signal;

transmitting the second optical signal to a second satellite.

22. A method as recited in claim 21 further comprising the step of coupling the second optical signal onto an optical bus.

23. A method as recited in claim 21 wherein the step of transmitting the second optical signal comprises the step of coupling the second optical signal into a transmitting telescope.

24. A method as recited in claim 21 wherein the step of transmitting the second optical signal comprises the step of amplifying the second optical signal.

25. A method as recited in claim 20 further comprising:

receiving a second RF signal;

converting the second RF signal into a second electrical signal;

converting the second electrical signal into a third RF signal; and transmitting the third RF signal to a ground station.

26. A satellite system comprising:

a plurality of satellites disposed in a ring, each of said plurality of satellites communicating optically with an adjacent satellite and communicating using an RF frequency with a ground station, each of said satellites comprising:

a receiving telescope;

an RF uplink receiving a first RF signal from the ground station and converting the first RF signal to a first electrical signal;

an RF downlink generating a second RF signal and transmitting the second RF signal to the ground station;

an optical bus coupled to said receiving telescope, said optical bus having a plurality of optical signals from said receiving telescope;

an optical interface coupled to said optical bus, said optical interface resolving a predetermined optical signal from said optical bus that is associated with the satellite, said optical interface converting said predetermined optical signal into a second electrical signal; and a router coupled to said optical interface, said RP uplink and said RF downlink, said router identifying said first electrical signal and routing said first electrical signal to said optical interface or said RF downlink, said router routing said second electrical signal from said optical interface to said RF downlink.

27. A satellite system as recited in claim 26 wherein the plurality of satellites comprises at least three satellites.

28. A satellite system comprising:

a plurality of satellites disposed in a ring, each of said satellites receiving a plurality of optical signals from an adjacent satellite and an RF signal from a ground station, each of said satellites resolving a first optical signal from the plurality of optical signals and converting the first optical signal to a first electrical signal, each of said satellites routing the first electrical signal to a downlink, each of said satellites converting the RF signal to a second electrical signal, each of said satellites routing the second electrical signal to an adjacent one of said plurality of satellites through an optical source or to the downlink.

29. A satellite system comprising:

a plurality of satellites disposed in a ring, each of said satellites receiving a plurality of optical signals from an adjacent satellite, and at least one of said plurality of satellites receiving an RF signal from a ground station, said at least one of said plurality of satellites resolving at least one optical signal from the plurality of optical signals, converting the at least one optical signal to at least one electrical signal, routing the at least one electrical signal to a downlink, converting the RF signal to a second electrical signal, and routing the second electrical signal to a destination.

30. A satellite system as recited in claim 29 wherein the destination is an adjacent one of said plurality of satellites and the second electrical signal is routed through an optical source as a second optical signal.

31. A satellite system as recited in claim 29 wherein the destination is the downlink.

* * * * *